H. W. SPANG.
Electric Railway-Signal.
No. 164,778.  Patented June 22, 1875.
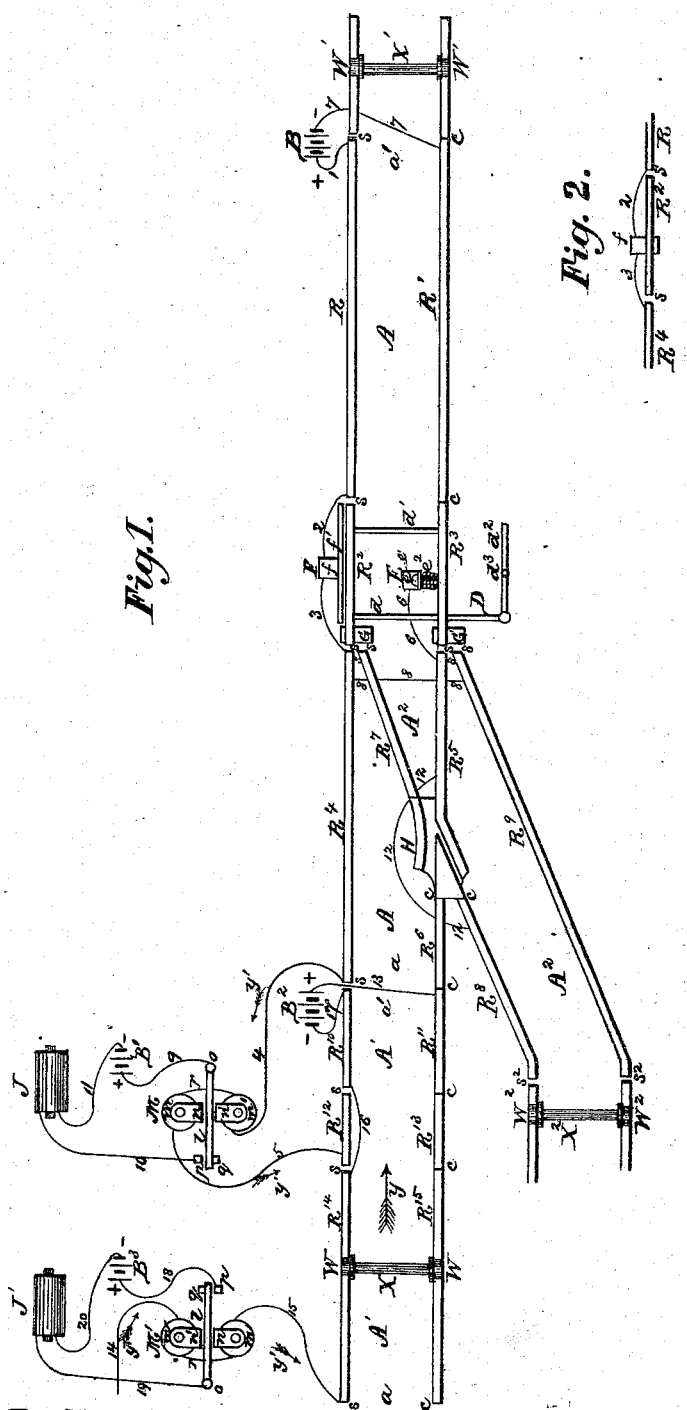
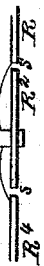
Fig. 2.
Fig. 1.

UNITED STATES PATENT OFFICE.

HENRY W. SPANG, OF READING, PENNSYLVANIA.

IMPROVEMENT IN ELECTRIC RAILWAY-SIGNALS.

Specification forming part of Letters Patent No. 164,778, dated June 22, 1875; application filed March 24, 1874.

*To all whom it may concern:*

Be it known that I, HENRY W. SPANG, of Reading, in the county of Berks and State of Pennsylvania, have invented Improvements in Electric Circuits and Devices for Railway-Signaling Apparatus, of which the following is a specification:

Figure 1 is a diagram illustrating my invention. Fig. 2 is a modification of a circuit-closer.

My invention relates to that class of electric circuits in which the two lines of rails of a section of railroad-track are used as the principal electric conductors between a galvanic battery and electro or relay magnet, which controls a visual or audible signal, or both. It consists, first, in a novel combination and arrangement of polarized relay-magets, which control secondary or local circuits, and visual or audible signals, or both, and galvanic batteries, with the rails of adjacent sections of railroad-tracks, so that a safety-signal cannot be given when a relay-magnet which is connected to one section of track is accidentally charged by a galvanic battery connected to an adjacent section of track; second, in the combination of a spring or other pressing circuit closer and breaker with a movable rail, or any other movable part of a railroad-switch, and an adjacent main-line rail, which is insulated from said movable switch-rail, so that a good electrical circuit or connection will be maintained between the said switch and adjacent main-line rails when the rails of said switch are set in line with the rails of the main track, and the circuit will be broken when the rails of said switch are not set in line with the rails of the main track; third, in the combination and arrangement of the movable rails of a railroad-switch with a circuit closer or breaker, or a metallic plate or conductor, and the adjacent main-line rails, so that when the said movable switch-rails are occupied by a locomotive or car, moving or at rest, the electric circuit of said main-line rails will be shunted or broken, and thereby a safety-signal will be prevented from being given.

A A and $A^1 A^1$, Fig. 1, are adjacent sections of railroad-track, each a mile long, more or less. $a$ $a'$ are the opposite ends thereof. D is a switch upon section of track A A, and $A^2 A^2$ is a section of a branch track or siding, connected with section of main track A A. Stationary rails R $R^1 R^4 R^5 R^6$, movable switch-rails $R^2 R^3$, and frog H form section of track A A, and rails $R^7 R^8 R^9$, also frog H, form section $A^2 A^2$ of branch track or siding. Rails $R^{10} R^{11} R^{12} R^{13} R^{14} R^{15}$ form section of track $A^1 A^1$. Rails $R^{12} R^{13}$ are about fifty feet in length, and when occupied by the wheels W W, united by their axle or axles X of a locomotive or car, they constitute a circuit-closer. Letter C indicates that the rails and other metallic conductors employed in sections of track A A $A^1 A^1 A^2 A^2$ are metallically connected together, and letters S and $S^1$ that they are insulated or separated from each other. Letters $S^2 S^2$ indicate the point where the rails $R^8 R^9$ of section $A^2 A^2$ of the branch track are insulated or separated from the rails of the other portion of the said branch track, and beyond which cars can stand on the said branch track without endangering trains on the main track. The movable rails $R^2 R^3$ of switch D are connected and held in their proper position by the solid metallic rods $d$ $d^1$, and are fastened thereto in the usual manner, and they rest upon and slide over metallic plates G G', when rod $d$ is moved by lever $d^2$ on its fulcrum $d^3$. The rail $R^2$ is separated or insulated from rails R and $R^4$, which are connected together by wire 2, metallic plate $f$ of circuit-closer F, and wire 3. The said plate, or other suitable conductor, $f$, is fastened to a wooden sill, and is separated from the curved lever $f'$ of circuit-closer F, which is also fastened to a sill or sills, and is adjacent to rail $R^2$. When lever $f'$ is not depressed by the wheel or wheels of a locomotive or car the circuit between plate $f$ and lever $f'$, and said wheel or wheels and rail $R^2$, will be broken, and when said lever $f^1$ is occupied and depressed by the wheel or wheels of a locomotive or car the circuit will be closed between plate $f$ and lever $f'$, and said wheel or wheels and rail $R^2$. Rail $R^3$ is metallically connected with rails $R^1$, and insulated or separated from rails $R^5$, and circuit is maintained between rails $R^3$ and $R^5$ by circuit closer and breaker E and wire 6, when switch-rails $R^2$ $R^3$ are set in line with main-line rails $R^4$ $R^5$, and the circuit is broken between them when said rails $R^2$ $R^3$ are not set in line with rails $R^4$ $R^5$.

The circuit closer and breaker E consists of a movable metallic rod or other suitable conductor, $e$, moving in a metallic frame or supporter, $e^1$, and is pressed against rail $R^3$, or any other suitable movable part of switch D, by a spring, $e^2$, so as to make a good electrical contact therewith when rails $R^2$ $R^3$ are set in line with rails $R^4$ $R^5$. The metallic plates G G' are separated or insulated from rails $R^4$ $R^7$ $R^5$ $R^9$, which can also rest upon metallic plates, but which must be insulated or separated from each other and from plates G G'. Branch-track rails $R^9$ are connected with main-track rails $R^4$ by wire 8, and branch-track rails $R^7$ $R^8$ are connected to main-track rails $R^5$ $R^6$ by frog H, so that the circuit of the rails of the section of main track A A will be extended to the rails of section $A^2$ $A^2$ of the branch track or siding, and thereby enable the circuit of the main track to be shunted and a danger-signal to be given when a car or cars on the branch track are pushed or blown out too near or across the main track, and thereby prevent a collision between a train on the main track and cars on the siding.

Instead of connecting rails $R^5$ $R^6$ $R^7$ $R^8$ to frog H, they can all be connected together by wire 12.

B $B^1$ $B^2$ $B^3$ are galvanic batteries. B is connected to rails of section of track A A at end $a'$, and $B^2$ is connected to rails of section of track $A^1$ $A^1$ at end $a'$ thereof, and the poles of said batteries B $B^2$ are reversed or in opposite positions. M or M' is a polarized relay-magnet of Siemens' or any other make, and consists of electro-magnets $m$ $m'$, connected together by wire $r$, and to the iron cores of said electro-magnets $m$ $m'$ poles or plates $n$ $n'$ are attached, and between which lever $l$ vibrates on its fulcrum $o$, contacting alternately with metallic point $p$ and hard-rubber or insulated point $q$. The said iron poles $n$ $n'$ and lever $l$ are polarized by iron cores of magnets $m$ $m'$ and lever $l$ being attached to a permanent magnet. The poles $n$ $n'$ and points $p$ $q$ are adjusted so that lever $l$ will be nearer pole $n'$, and be attracted thereby, when the battery current is not passing over magnets $m$ $m'$, and lever $l$ will only contact with metallic point $p$ when current of battery B flows over relay M, and current of battery $B^2$ flows over relay M', in direction of arrow $y$. J or J' is an ordinary electro-magnet, whose armature-lever should be employed in connection with suitable mechanism controlling a visual or audible signal, so that when not charged by battery $B^1$ or $B^3$ a caution or danger semaphoric signal will be shown, or a bell will not be sounded; and, when charged, the caution or danger semaphoric signal will be removed from view, thereby indicating safety; or a semaphoric signal indicating safety will be shown, or a bell will be sounded, thereby indicating safety.

When a locomotive or train moving in direction of arrow $y$ approaches end $a$ of section of track A A, and rails $R^{12}$ $R^{13}$ of section $A^1$ $A^1$ are occupied by the wheels W W and axles X thereof, the circuit of battery B will flow over wire 1, rails R, wire 2, plate $f$, wire 3, rails $R^4$, wire 4, magnet $m'$, wire $r$, and magnet $m$ of relay M, wire 5, rails $R^{12}$, wheels W W, axles X, rails $R^{13}$ $R^{11}$ $R^6$, frog H, rails $R^5$, wire 6, circuit-closer E, rails $R^3$ $R^1$, and wire 7, thereby changing the polarity of poles $n$ $n'$, and causing lever $l$ to be attracted by pole $n$, and to contact with metallic point $p$, thereby closing circuit of battery $B^1$ over wire 9, lever $l$, metallic point $p$, wire 10, electro-magnet J, and wire 11, charging magnet J, and causing a safety-signal to be given, as hereinbefore explained.

Should rails $R^4$ $R^5$ of section A A be occupied by the wheels $W^1$ $W^1$ and axles $X^1$ of a preceding locomotive or train when said wheels W W and axles X of the following locomotive or train occupy rails $R^{12}$ $R^{13}$ of section $A^1$ $A^1$, the circuit of battery B will only flow over wire 1, rails R, wire 2, plate $f$, wire 3, rails $R^4$, wheels $W^1$ $W^1$, axles $X^1$, rails $R^5$, wire 6, circuit closer and breaker E, rails $R^3$ $R^1$, and wire 7, and not over relay M, as hereinbefore described, and consequently a danger or caution signal will continue to be given.

When wheels $W^1$ $W^1$ and axles $X^1$ of a locomotive or car, moving or at rest, are upon switch-rails $R^2$ $R^3$, the tread of the said wheels will depress curved lever $f'$, and cause it to contact with plate $f$, and circuit of battery B will flow over wire 1, rails R, wire 2, plate $f$, lever $f'$, wheels $W^1$, rail $R^2$, axle $X^1$, wheels $W^1$, rails $R^3$ $R^1$, and wire 7.

Should a car or cars on the siding or branch track be pushed or blown out, and the wheels $W^2$ $W^2$ and axles $X^2$ thereof occupy rails $R^7$ or $R^8$ and $R^9$ of section $A^2$ $A^2$, and thereby be too near or across the rails of main track A A, and endanger a locomotive or train on said main track, the circuit of battery B will flow over wire 1, rail R, wire 2, plate $f$, wire 3, rail $R^4$, wire 8, rails $R^9$, wheels $W^2$ $W^2$, axles $X^2$, rails $R^7$ or $R^8$, frog H or wire 12, rails $R^5$, wire 6, circuit-closer E, rails $R^3$ $R^1$, and wire 7, and not over relay M, as hereinbefore described.

Should rails $R^2$ $R^3$ of switch D not be set in direct line with main-line rails $R^4$ $R^5$, or be set in line with rails $R^7$ $R^9$ of the section $A^2$ $A^2$ of the branch track or siding, rail $R^3$ will not contact with rod $e$ of circuit-closer E, and the continuous metallic circuit, hereinbefore described, by which relay-magnet M is charged by battery B, will be broken, and the circuit of battery B will flow over wires 1 7, rails R $R^1$, and the sills, and into the earth adjacent to said rails $R$ $R^1$, and will not flow over relay M, as hereinbefore described, when rails $R^{12}$ $R^{13}$ are occupied by wheels W W and axles X of locomotive or train.

Should a rail in sections of rails $R$ $R^1$ $R^4$ $R^5$ $R^6$ or frog H be removed or broken, the continuous metallic circuit hereinbefore described will be broken, and circuit of battery B will not flow over relay M, as hereinbefore described.

Lever $l$ of relay M' will be attracted by plate or pole $n$, and will contact with metallic point $p$, and close circuit of battery $B^3$ over wire 18, point $p$, lever $l$, wire 19, magnet J', and wire 20, and cause a safety-signal to be given when circuit of battery $B^2$ flows over wire 13, rails $R^{11}$ $R^{13}$ $R^{15}$, rails of adjacent section of track, wheels and axles of locomotive or train, wire 14, magnet $m'$, wire $r$, and magnet $m$ of relay M', wire 15, rails $R^{14}$, wire 16, rails $R^{10}$, and wire 17.

If the proper separation or insulation of rails $R^4$ $R^{10}$ is not maintained at $S^1$ the said rails are liable to contact with each other, particularly during the summer, when the rails expand, and metallic connection can also be made between said rails $R^4$ and $R^{10}$ by a piece of metal accidentally coming in contact with the base of said rails $R^4$ and $R^{10}$, and when metallic connection is made between rails $R^4$ $R^{10}$ the circuit of battery $B^2$ will flow, when rails $R^{12}$ $R^{13}$ are occupied by all the wheels W W and axles X of a locomotive, over wire 13, rails $R^{11}$ $R^{13}$, wheels W W and axles X of said locomotive, rails $R^{12}$, wire 5, magnet $m$, wire $r$, and magnet $m'$ of relay M, wire 4, rail $R^4$, thence to rail $R^{10}$ and wire 17, thereby causing the magnetism of pole $n'$ to be increased, and lever $l$ to still continue to contact with hard-rubber point $q$, and thereby lever $l$ will still continue to keep circuit of battery B open and magnet J demagnetized, and a danger-signal to be given, as hereinbefore explained, to the engineer of said locomotive.

The object, therefore, of employing polarized relay-magnet M, instead of an ordinary relay-magnet, in connection with rails of section of track A A at end $a$, and connecting battery $B^2$ to the rails of adjacent section of track $A^1$ $A^1$ at end $a'$, so that the poles thereof will be in an opposite position to those of battery B, which is connected to rails of section of track A A at end $a'$, is to prevent lever $l$ contacting with metallic point $p$, and causing a safety-signal to be given, when current of battery $B^2$ passes over relay M, as hereinbefore described, which is an important feature, for the reason that at the time the current of battery $B^2$ passes over relay M, as hereinbefore described, the rails $R^2$ $R^3$ of switch D might be set in line with rails $R^7$ $R^9$ of the branch track $A^2$ $A^2$, a rail in section of track A A might be removed or broken, or rails $R$ $R^1$ of section of track A A might be occupied by a preceding locomotive or train. As hereinbefore stated, the rails $R^2$ $R^3$ are connected by the solid metallic rods $d$ $d^1$, and the object of insulating rails $R^2$ from $R$ $R^4$, and connecting said rails $R$ $R^4$ with circuit-closer F by wires 2 and 3, is to enable circuit of battery B to flow from rails $R$ $R^1$ to rails $R^4$ $R^5$ without being shunted when rails $R^2$ $R^3$ are not occupied by a locomotive or car, and to shunt the circuit of battery B when rails $R^2$ $R^3$ are occupied by a locomotive or car, moving or at rest, as it is important that every part of the section of track A A, including the movable switch-rails $R^2$ $R^3$, should be protected, and a safety-signal be prevented from being given, when they are occupied by a locomotive or car.

The curved lever $f'$ of circuit-closer F can be dispensed with, and the plate $f$ can be placed underneath, but separated from $R^2$, as shown in Fig. 2, so that when rail $R^2$ is occupied and depressed by a locomotive or car it will contact with plate $f$.

A gum or other spring can be placed under curved lever $f'$ or rail $R^2$, so that lever $f'$ or rail $R^2$ will only be depressed and contact with plate $f$ when said lever or rail is occupied by a locomotive or car, and not when a person is standing on said lever or rail. Instead of the circuit-closer F, a circuit-closer and breaker can be employed, so that when rails $R^2$ $R^3$ of switch D are not occupied by a locomotive or car, the circuit between wires 2 and 3 will be closed, and when said rails are occupied by a locomotive or car the circuit between wires 2 and 3 will be broken. The divisions of sections of rails $R$ $R^1$ $R^4$ $R^5$ $R^6$ $R^7$ $R^8$ $R^9$ $R^{10}$ $R^{11}$ $R^{14}$ $R^{15}$ in sections of track A A $A^1$ $A^1$ $A^2$ $A^2$ should each have metallic continuity throughout its length by having the ends of the rails jointed together by the usual metallic fish-plates, which should be kept well screwed up, so as to form a good electrical connection and circuit between them, and should any of the said fish-plates get loose often, and fail to maintain a good connection between the rails, it will be advisable to place a copper wire between one of the fish-plates and the rails, or underneath the rails, and solder the ends of said wire to the ends of the adjacent rails.

Having now fully explained my invention, I claim—

1. The combination of a series of batteries, polarized relays, and means for making or breaking the circuits of the batteries, arranged substantially as set forth, whereby any one of the relays will be operatively affected only by the current from its own designated battery, and not by the current from either of the batteries adjacent to such designated battery.

2. The combination and arrangement of polarized relay M, section of track A A, and battery B with polarized relay M', section of track $A^1$ $A^1$, and battery $B^2$, so that should current of battery $B^2$ pass over relay M a safety-signal will not be given, as set forth.

3. Circuit-closer and breaker E and wire 6, in combination with rails $R^3 R^5$, as set forth.

4. Switch-rails $R^2 R^3$, in combination with rails $R^1 R^5 R$, wire 2, circuit-closer F, or plate $f$, wire 3, and rails $R^4$, as and for the purpose set forth.

5. Rails $R^7 R^8 R^9$ of section $A^2 A^2$ of branch track or siding, and wire 8, in combination with frog H, or wire 12, and rails $R^4 R^5 R^6$ of main track A A, as set forth.

In testimony whereof I hereunto sign my name in presence of two subscribing witneses.

HENRY W. SPANG.

Witnesses:
   C. T. SELLERS,
   D. SPANG.